United States Patent [19]
Van Breemen et al.
[11] 4,080,607
[45] Mar. 21, 1978

[54] JET DROP PRINTING HEAD AND ASSEMBLY METHOD THEREFOR

[75] Inventors: Bertram Van Breemen; Ronald T. Wilson, both of Dayton, Ohio

[73] Assignee: The Mead Corporation, Dayton, Ohio

[21] Appl. No.: 704,572

[22] Filed: Jul. 12, 1976

[51] Int. Cl.[2] ............ G01D 15/18
[52] U.S. Cl. ............ 346/75; 346/145
[58] Field of Search ............ 346/75, 145; 118/314

[56] References Cited

U.S. PATENT DOCUMENTS 3,580,515 5/1971 Cassill ............ 346/75 X
3,805,273 4/1974 Brady et al. ............ 246/75

*Primary Examiner*—Joseph W. Hartary
*Attorney, Agent, or Firm*—Biebel, French & Nauman

[57] ABSTRACT

A jet drop printing head comprises a transportable upper assembly and a lower assembly adapted for receiving the upper assembly in such a manner as to control the alignment between the two assemblies. The upper assembly, which is primarily a fluidics package, carries an orifice plate and fluidic elements for producing a jet-forming flow of printing liquid through a series of orifices in the orifice plate. The upper assembly also carries a set of three rests which have been prealigned for mating engagement with a set of precision machine balls mounted in a charge ring plate carried by the lower assembly. Upon assembly the three rests are readily received by the three balls, and the orifice plate orifices are brought into precise registration with corresponding apertures in the charge ring plate. In this arrangement the charge plate assembly, including the three balls, functions as a reference subassembly, and once an upper assembly has had its three rests adjusted for alignment with any charge plate assembly, then the upper assembly may be mated with any lower assembly carrying a similar charge plate and ball arrangement.

24 Claims, 39 Drawing Figures 61
62
63
64
65
67
68
69
73
74
176
177
178
179
181
183
32
3
4

JET DROP PRINTING HEAD AND ASSEMBLY METHOD THEREFOR

BACKGROUND OF THE INVENTION

This invention relates to jet drop printing heads of the general type disclosed in Beam et al U.S. Pat. No. 3,586,907. Such printing heads comprise an orifice plate for forming a row of liquid jets and a charge ring plate provided with a series of charge rings for selective charging of drops formed by the jets. There are also fluidic elements for supplying printing liquid to the orifice plate, deflection electrode means for deflection of drops charged by the charge rings, and a catcher for catching drops which are so deflected. Non-deflected drops deposit upon a printing medium transported below the print head.

Jet drop print heads of the above described type are inherently capable of high speed, high resolution printing, but there are very exacting manufacturing tolerance requirements. Moreover use of the print head over a long period of time causes erosion of the orifice plate and deposition of contaminants in the fluidic system. Accordingly, it is necessary to disassemble the print head from time to time for refurbishing the fluidic elements and thereafter to reassemble the print head with the charge ring apertures in precise alignment with the jet forming orifices. In the past this has been a very tedious process and one which is difficult for unskilled or semi-skilled operating personnel in a normal operational environment.

The Beam et al print head has a further difficulty in that a plurality of such print heads must be assembled together to provide solid printing coverage. Such an assembly may be accomplished as shown in Cassill U.S. Pat. No. 3,580,515, but there is in any event some difficulty in achieving the necessary alignment accuracy between the different heads. The Beam et al print head was therefore improved by the invention of a new print head arrangement as taught by Mathis U.S. Pat. No. 3,701,998.

The Mathis patent shows a twin row print head capable of solid printing coverage without the cooperation of any other print head. Again there is provision for an orifice plate and a charge ring plate which is in alignment therewith. The Mathis device contemplates an extremely large number of very small diameter jets and at the time of its invention represented a new generation of jet drop print heads. The new level of resolution obtainable by the Mathis device created a requirement for even more accurate alignment between the orifice plate and the charge ring plate.

In order to facilitate assembly and disassembly of jet drop printing elements of the type shown in the Mathis patent there has been developed an improved mounting arrangement as shown in Brady et al U.S. Pat. No. 3,805,273. In this arrangement there is a segregation between the fluidic elements, which are incorporated into an upper assembly, and the electrical elements, which are incorporated into a lower assembly. With such an arrangement it is relatively easy to disassemble the print head for refurbishment of the fluidic package. However, reassembly is a somewhat tedious process because of the above mentioned requirement for precision alignment between the orifice plate, now part of the upper assembly and the charge ring plate, which is part of the lower assembly. Also, for improved operation in the field, it has become desirable to improve the catcher mounting arrangement and extend operating life of the fluidics package.

SUMMARY OF THE INVENTION

This invention provides improved apparatus and method for assembling a jet drop print head upper assembly, including an orifice plate, to a jet drop print head lower assembly, including a charge plate, and causing relative alignment between the two plates. Alignment is produced by mounting a set of positioning elements at predetermined positions on one of said plates and mounting a corresponding set of adjustable reference elements on the assembly including the other plate. Once the reference elements have been adjusted, the two assemblies may be assembled in desired alignment by bringing the positioning elements in one assembly into mating relationship with the reference elements in the other assembly.

The positioning elements are preferably three hard metal precision manufactured balls mounted on the charge plate, and the reference elements are preferably a set of three rests carried by the upper assembly. One such rest has a conically recessed lower surface which when mated with a corresponding ball prevents horizontal translation of the rest. A second one of such rests has a vee-shaped lower surface which when mated with its corresponding ball permits the rest to be translated one dimensionally in a horizonal direction. The third rest has a flat lower surface for resting on its corresponding ball without horizontal constraint of the rest. The balls may be seated in apertures in the charge plate and mate readily with the rests in a manner facilitating fast print head assembly without mechanical binding.

Accordingly it is an object of this invention to provide a jet drop print head and a charge plate subassembly adapted for easy on-site maintenance and increased operating life.

It is another object of this invention to provide improved apparatus and method for aligning a charge plate with an orifice plate in a jet drop print head.

Other and further objects of the invention will be apparent from the following description, the accompanying drawings and the appended claims.

DESCRIPTION OF THE PREFERRED EMBODIMENTS

Figure 1:
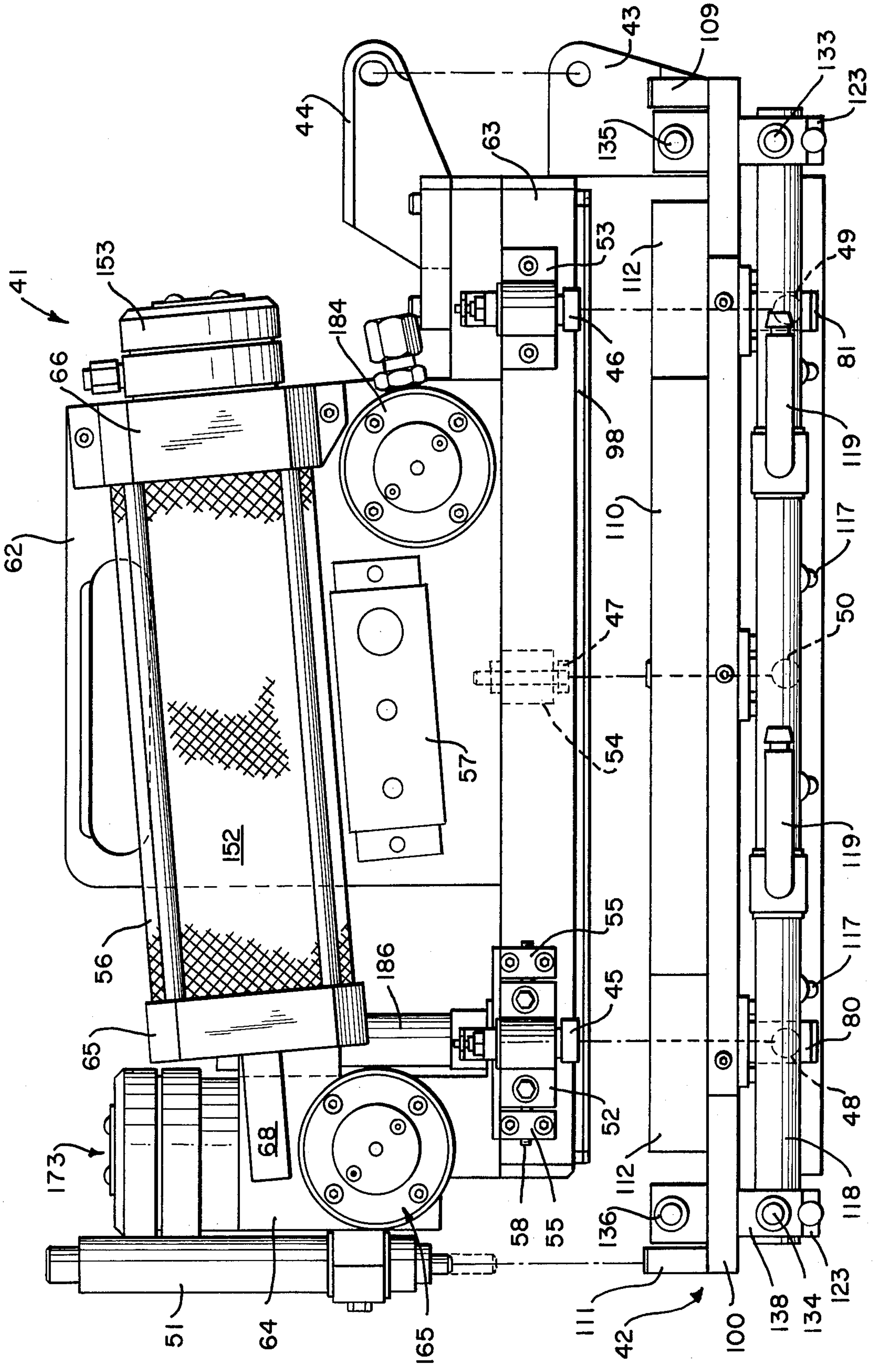
FIG. 1 is an assembly drawing showing an upper assembly, a lower assembly and the mating relationship therebetween.
Figure 29:
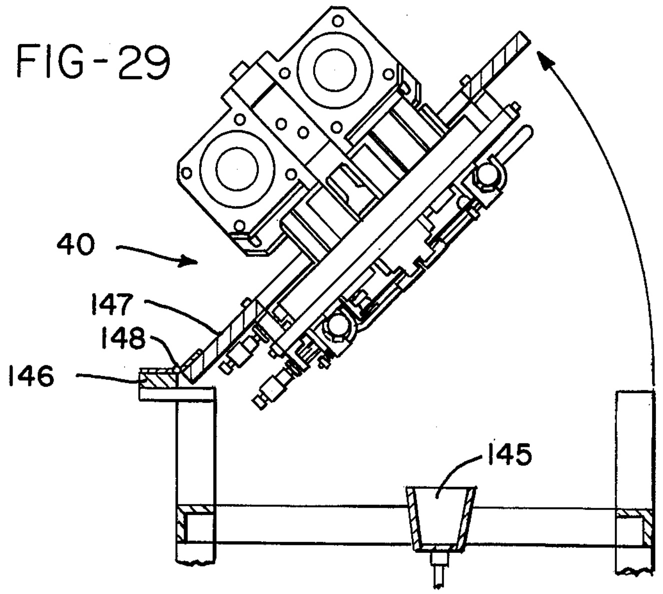
FIG. 29 illustrates mounting arrangements for a printing head at a printing station.

A print head 40 constructed in accordance with this invention may appear as illustrated generally in FIG. 29 and in more detail in FIG. 1. Head 40 comprises an upper assembly 41, which is primarily a fluidics package and a lower assembly 42, which contains the principal electrical components. Upper assembly 41, however, does include an electrically driven stimulator 186 and a driver 57 therefor. The stimulator causes drop generation as taught by U.S. Pat. No. 3,739,393, and may be constructed as taught by U.S. Pat. No. 3,701,476. It is fitted into an opening 183 of FIG. 2. Driver 57 is constructed for operation generally in accordance with the teachings of U.S. Pat. No. 3,868,698.

Figure 28:
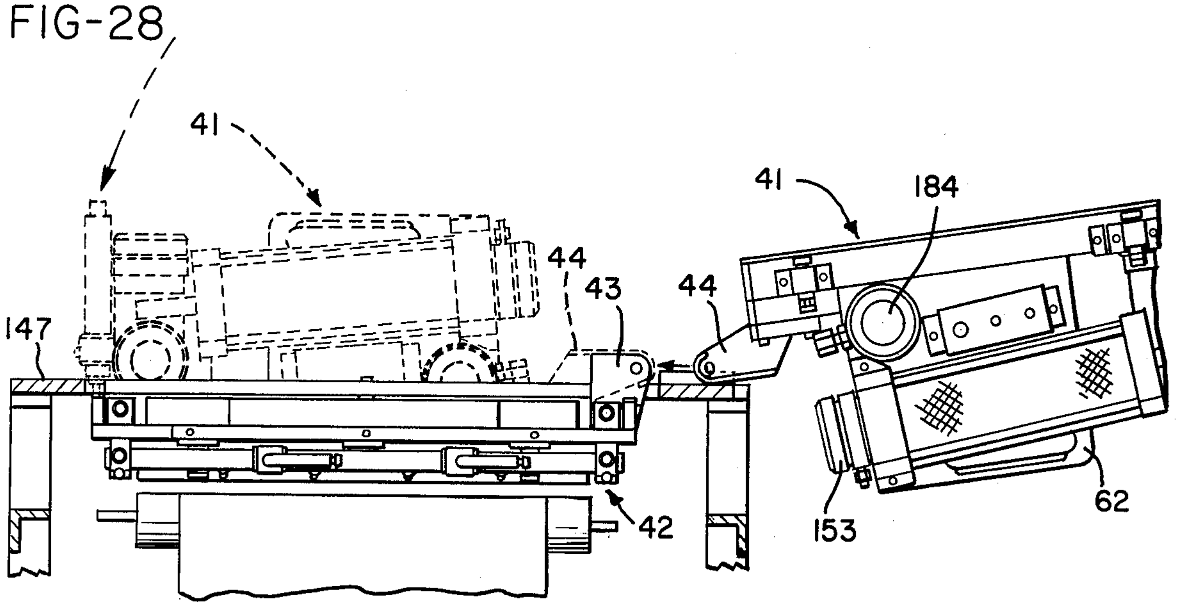
FIG. 28 illustrates the procedure for mounting an upper assembly into a lower assembly.

Upper assembly 41 includes a mounting fitting 44, and lower assembly 42 includes a clevis 43 for reception of mounting fitting 44. In operation upper assembly 41 is subject to deterioration and requires periodic refurbishment. Accordingly a replacement upper assembly 41 may be mated to an older lower assembly 42 as illustrated generally in FIG. 28. An impact absorber 51 absorbs the shock of the final step in the mating procedure. Upper assembly 41 is configured for ready carrying in a suitable carrying case (not illustrated), whereby transportion from a refurbishing center to an on-site printing press is easily effected. In operation lower assembly 42 is supported at a printing station by a table top 147 (FIG. 29).

The interface between upper assembly 41 and lower assembly 42 is defined by three precision steel balls 48 through 50 and three rests 45 through 47. These three rests respectively have conically shaped, vee-shaped, and flat feet as hereinafter described in detail.

Figure 19:
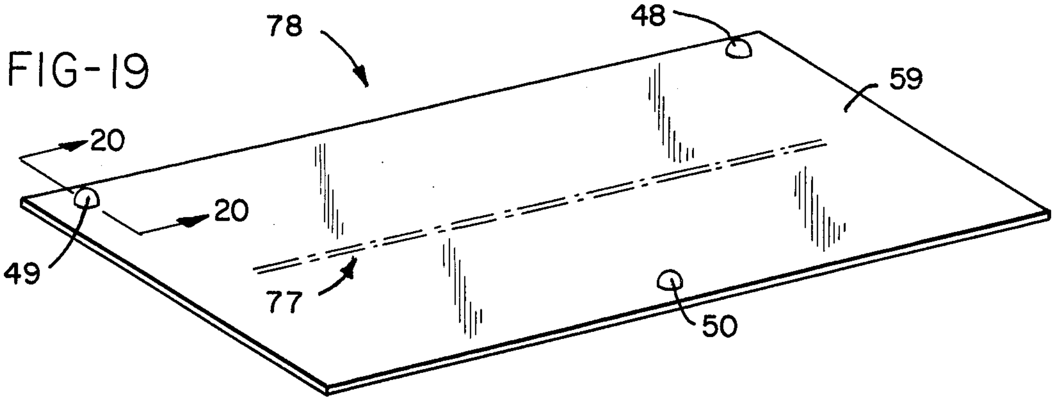
FIG. 19 is a pictorial illustration of a charge plate assembly.

Rest 45 is carried by a moveable mounting block 52, which is attached to a pair of adjustment blocks 55 by a threaded member 58. Rests 46 and 47 are carried respectively by mounting blocks 53 and 54. Balls 48 through 50 are carried by charge ring plate 59 as illustrated in FIG. 19.

The above described ball and rest arrangement provides an extremely accurate, easily mated, three-point interface between upper assembly 41 and lower assembly 42. The alignment procedure, which is further described below, is similar in many respects to the procedure for alignment of a mirror mounted by kinematic mounting in an interferometer. As a result the orifices in an orifice plate 60 (see FIG. 12) may be brought into precise registration with the charge rings in charge ring plate 59. Charge ring plate 59 is manufactured to extremely exacting tolerances, so that once an upper assembly 41 has been aligned to any charge ring plate 59, it may be quickly fitted to a lower assembly 42 carrying any other charge ring plate. Having achieved the required alignment, drop generation, charging and catching may be carried out as generally taught in U.S. Pat. Nos. 3,701,998 and 3,739,393.

Figures 2, 3, 4:
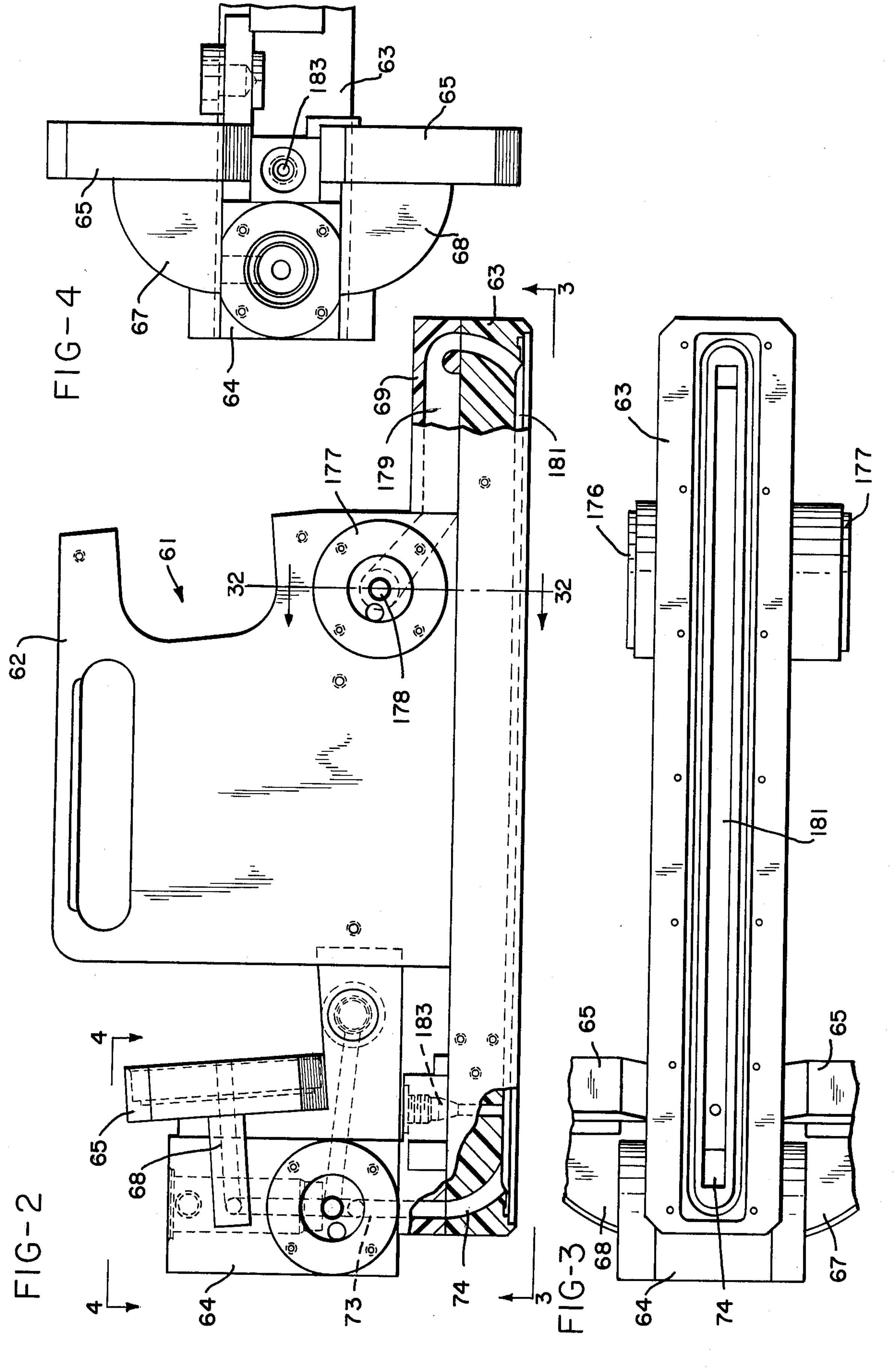
FIG. 2 is a side elevation view of a housing for a fluidics package.
FIG. 3 is a view taken along lines 3—3 of FIG. 2.
FIG. 4 is a view taken along lines 4—4 of FIG. 2.
Figure 6:
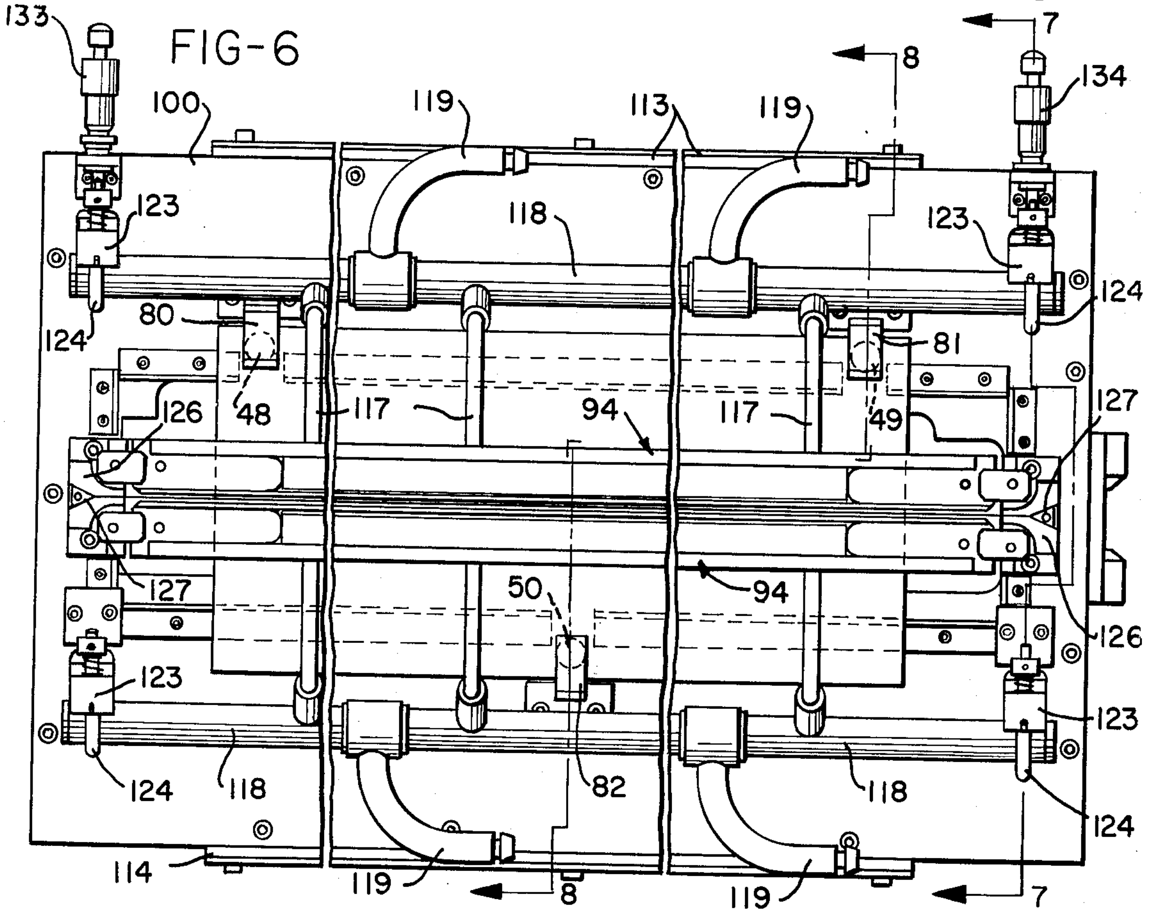
FIG. 6 is a bottom plan view of a lower assembly.
Figures 7, 8:
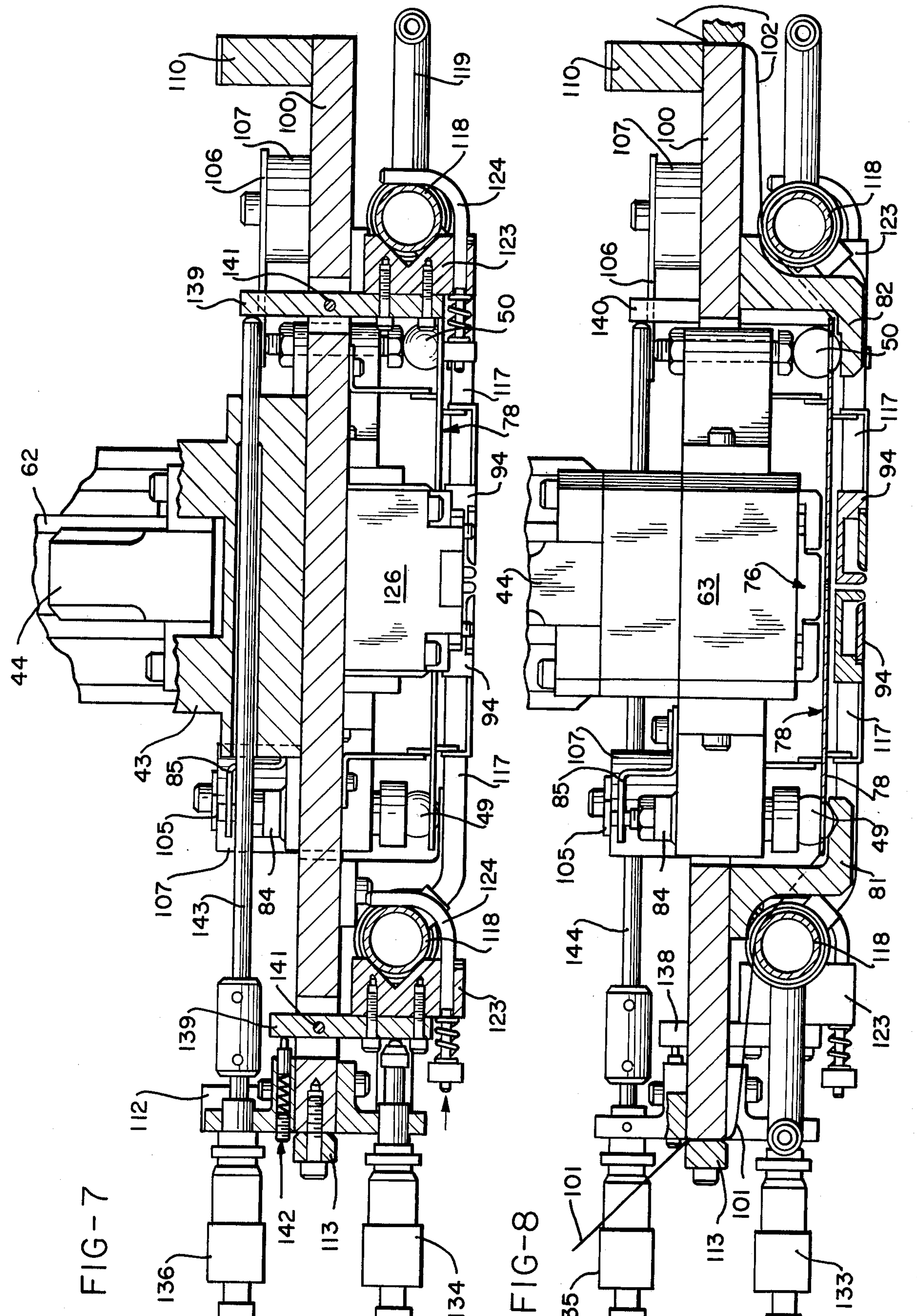
FIG. 7 is a view taken along lines 7—7 of FIG. 6.
FIG. 8 is a view taken along lines 8—8 of FIG. 6.
Figure 12:
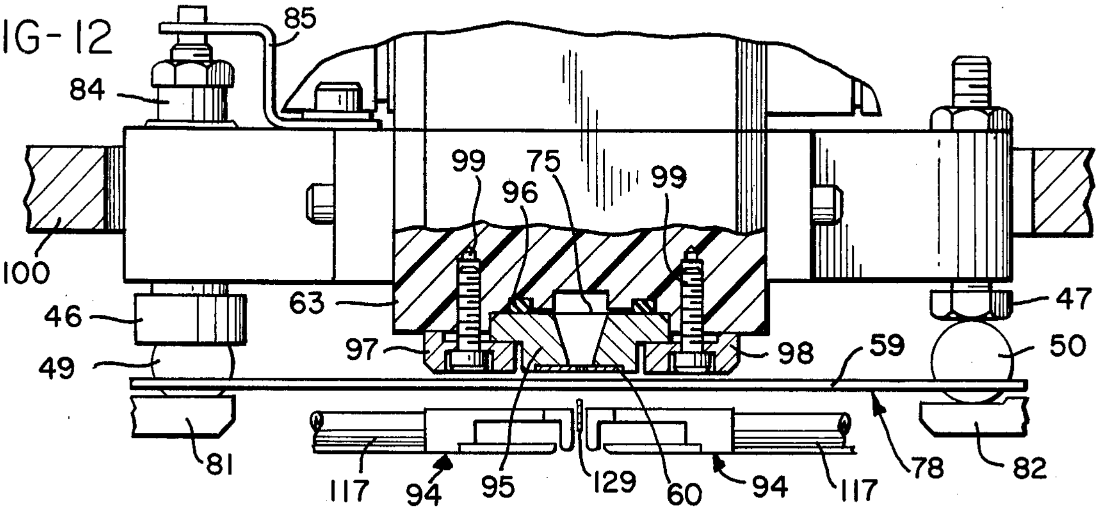
FIG. 12 is a partially cut away end view of a jet drop print head with an orifice plate assembly mounted in the operating position.
Figure 13:
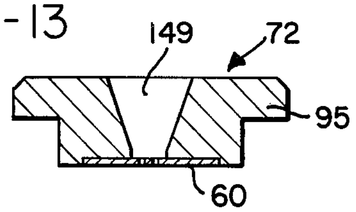
FIG. 13 is a cross-sectional view of an orifice plate assembly.

The principal structural element of upper assembly 41 is a plastic housing 61 as illustrated in FIGS. 2 through 4. An orifice plate assembly 72 (FIG. 13) is attached to housing 61 as shown in FIG. 12. Bottom assembly 42 is shown somewhat in more detail in FIG. 5, and further details of the overall combined head assembly are shown in FIGS. 6 through 8.

Referring now to FIG. 2, it will be seen that housing 61 comprises a handle portion 62, a manifold portion 63, a liquid inlet block 64, and an air return block 69. Housing 61 is conveniently fabricated from clear acrylic plastic, the various elements thereof being separately fabricated and cemented together to create an unitary structure. The passageways as illustrated are conveniently fashioned by a lost wax casting process.

The clear acrylic plastic construction material has been found to be relatively inert in the presence of water base printing inks, and the inherent transparency enables ready location of blocked internal passages. Furthermore, the plastic material is a natural acoustic damper. Thus, the housing will not interfere with stimulation of the jets by vibrating at harmonics of the stimulation frequency.

Cemented to housing 61 as integral parts thereof are a pair of filter lower supports 65 and two rib members 67 and 68. Rib member 67 is provided with an ink supply passage 70 (see FIG. 30), and rib member 68 is provided with a purge fluid supply passage 71. Passages 70 and 71 are internally connected via a passage 73 to a liquid outlet passage 74 and an elongated cavity 181. Cavity 181 cooperates with another cavity 149 in an orifice plate holder 95 (FIG. 13) to define a reservoir for printing ink being pumped through orifices 76 in orifice plate 60.

In order to reduce turbulence in flush fluid or ink being supplied to orifice plate 60, liquid outlet passage 74 may have a square crossection. Still further turbulence reduction may be achieved by fitting an inlet plate of appropriate configuration between housing 61 and orifice plate assembly 72. This inlet plate may be configured as taught by Houser U.S. Pat. No. 3,645,448 or alternatively may be a screen-type device with a relatively large mesh.

Figure 14:
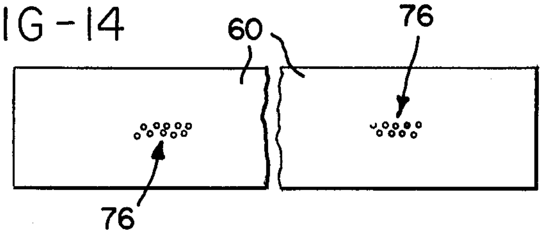
FIG. 14 is a plan view of an orifice plate.
Figure 15:
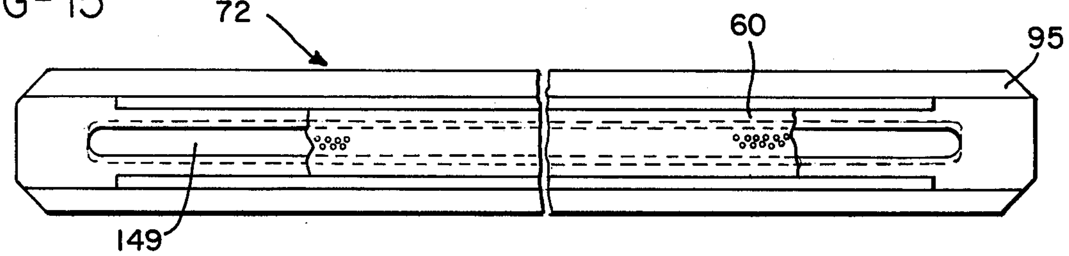
FIG. 15 is a bottom plan view of an orifice plate assembly.

For embodiment of the invention herein described there is an inlet plate 75 of the screen type, located as indicated in FIG. 12. The screen may be a sheet of 0.25 mm stainless steel with 0.3 mm openings spaced 0.5 mm apart. Jet forming orifices 76 in orifice plate 60 are somewhat smaller than the screen mesh openings, being about 0.0457 mm in diameter and arranged in two rows as illustrated in FIG. 14 at a center-to-center of spacing of 0.423 mm. The distance between the two rows may be on the order of about 0.148 cm. A total of 1,281 orifices 76 may be arranged as described to provide an active printing area 27.072 cm wide.

Figure 21:
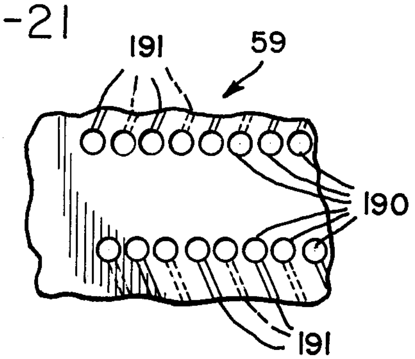
FIG. 21 is a fragmentary view of an arrangement of charge rings in a charge plate.

It will be appreciated that orifice plate 60 must be manufactured to extreme accuracy and aligned with very exacting precision to charge plate 59. As taught by Mathis U.S. Pat. Nos. 3,701,998 and Beam et al 3,586,907, charge plate 59 (FIGS. 19 and 21) is provided with a series of apertures 190 which are coated with conductive lining and connected to a series of printed circuit leads 191. For ease of manufacturing, printed circuit leads 191 may be alternately plated on opposite sides of charge ring plate 59. Printed circuit leads 191 are connected electrically to cables 101 and 102 of FIG. 8. Cables 101 and 102 carry charge control signals, so that apertures 190 may function as jet charge control electrodes.

Each one of apertures 190 corresponds to one of orifices 76 and must be accurately aligned therewith for satisfactory normal operation. At the same time it is necessary to disassemble print head 40 periodically for refurbishment of the fluidic components including orifice plate 60. Ready assembly and disassembly for such purposes is provided by segregating the fluidic components from the electrical components as above mentioned. Segregation of this type is not broadly new, as such a feature is incorporated in the prior art head of Brady et al U.S. Pat. No. 3,805,273. Prior to this invention, however, the alignment procedure associated with reassembly has been quite tedious and has required the skills of specially trained personnel.

It has now been found that field assembly may be accomplished quickly and easily by providing a charge plate assembly 78, as illustrated in FIG. 19, and assembling it within lower assembly 42 as hereinafter described. When thusly assembled charge plate assembly 78 is a geometrical reference structure capable of ready mating with any upper assembly 41 which has been prealigned with another such charge plate assembly 78.

Figure 20:
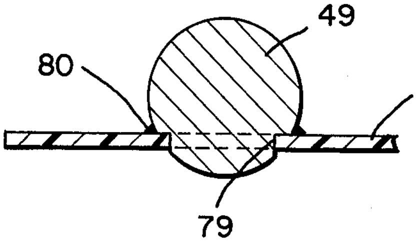
FIG. 20 is a sectional view taken along lines 20—20 of FIG. 19.

Charge plate assembly 78 comprises charge plate 59 and the three above mentioned precision machined balls 48 through 50. As illustrated in FIG. 20, charge plate 59 may have three ball seats 79 for reception of the balls 48 through 50. Each of the balls may have a surface ridge machined thereon for seating within its seat 79, and the ball may be bonded in place as at 80. Ball seats 79 and charge ring apertures 190 must be fashioned in charge plate 59 with equal accuracy, and either a machining or photofabrication technique may be used. Charge plate 59 may be made from a ceramic, plastic or other insulative material. Alternatively, it may be made of conductive material with an insulative coating to isolate the charge rings from one another.

Figure 23:
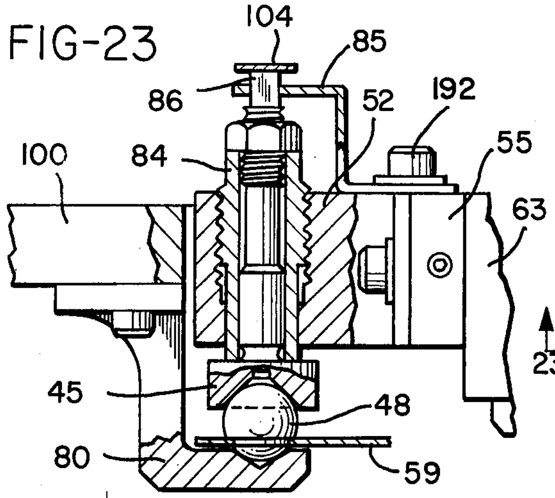
FIG. 23 is a view taken along lines 23—23 of FIG. 22.

As stated previously, balls 48 through 50 mate with three rests 45 through 47. Details of the mating relationship are shown in FIG. 23 wherein the cone-shaped foot of rest 45 is in engaagement with ball 48. Ball 48 rests on a bracket 80, which is part of lower assembly 42. Balls 49 and 50 likewise rest on brackets 81 and 82, all three of said brackets being illustrated in FIG. 6. Bracket 80 has a cone-shaped seat 83 to match the foot of rest 45, and bracket 81 similarly has a vee-shaped seat (not illustrated). The upper surface of bracket 82 is flat.

As shown in FIG. 23, rest 45 is carried by a threaded insert 84, which is threaded into mounting block 52. Rests 46 and 47 are carried by similar inserts, so as to provide means for adjusting the vertical dimensional relationship between upper assembly 41 and lower assembly 42, it being understood that rest 45, insert 84, and block 52 are all part of upper assembly 41.

Figure 22:
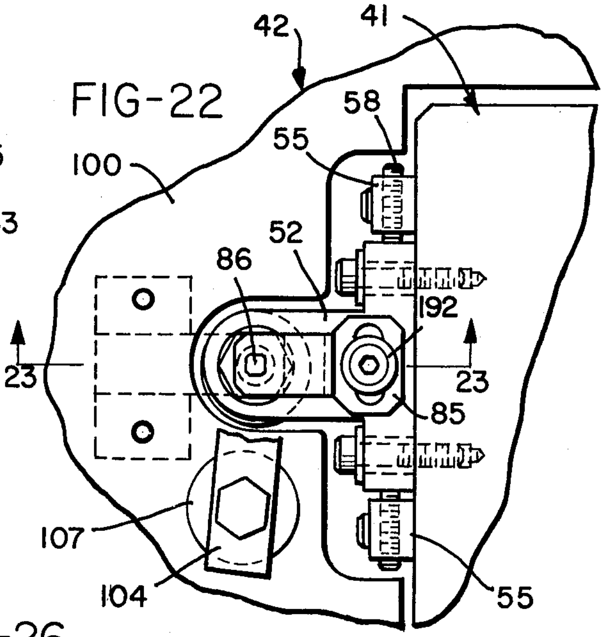
FIG. 22 is an illustration of an adjustable mounting for a rest.

Orifice plate 60 is carried by upper assembly 41 in fixed relation to the support structure for mounting blocks 52 through 54. Therefore, a rough, horixontally lengthwise, adjustment of orifice plate 60 relative to charge a charge plate or other reference fixtures may be accomplished by axial advancement of threaded member 58 (see FIG. 22). For fine adjustment of the relative horizontal positioning between the orifice plate and a charge plate there is provided an adjustment arm 85 for rest 45 and a similar adjustment arm (not illustreated) for rest 46. For engagement with these adjustment arms, rests 45 and 46 have rectangular upper ends 86 and 87 as shown in FIGS. 24 and 25, respectively.

Figure 24:
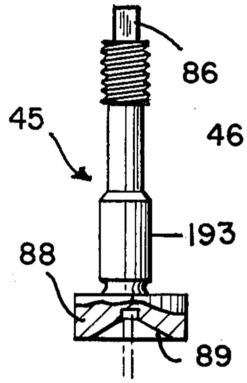
FIG. 24 is a view of a rest having a foot with a conical recess.
Figure 25:
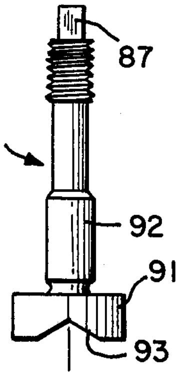
FIG. 25 is a view of a rest having a foot with a vee-shaped recess.
Figure 27:
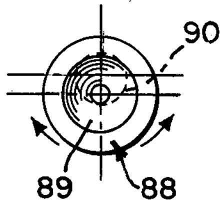
FIG. 27 is a bottom view of the rest of FIG. 24.

Referring now to FIG. 24, it will be seen that the conical recess 89 in foot 88 of rest 45 is positioned off center from the axis of shank 193. This means the center of conical recess 89 traces out a circular path as shown by the dotted circle 90 in FIG. 27 when shank 193 of rest 45 is rotated. Thus, it is possible to provide horizontal adjustment in two directions by loosening nut 192 of FIG. 23 and arcuately moving adjustment arm 85. The manufacturing and assembly tolerances of head 40 are such that the small amount of adjustment so provided is all that is ever required.

Figure 26:
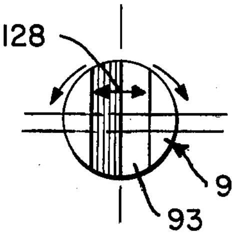
FIG. 26 is a bottom view of the rest of FIG. 25.

Having adjusted rest 45 as above described, it is necessary to make a similar adjustment to rest 46. Thus, the foot 91 of rest 46 engages its ball 49 at a point off center from shank 92. Since rest 46 is provided with a vee-type recess 93 in foot 91, rotation of rectangular upper portion 87 by an associated adjustment arm produces one dimensional movement of upper assembly 41 relative to a ball in mating engagement with recess 93. This relative motion is indicated by the double arrow 128 of FIG. 26.

There are a number of techniques which may be employed for iteratively adjusting the two rests 45 and 46 to produce exact horizontal alignment between orifice plate 60 and a reference structure corresponding to charge plate 59. Such alignment may be carried out with the aid of suitable optical instruments and is customarily done by specially trained personnel at a refurbishing center, where new or refurbished upper assemblies 41 are being prepared for use with lower assemblies 42 already in the field.

Once the alignment has been completed, as above described, upper assembly 41 may be transported to a printing plant where there may be a lower assembly 42 requiring service. At the plant the old upper assembly may be removed and the new, prealigned upper assembly rapidly inserted into place. No further alignment should be required.

The final spatial relationship between orifice plate 60 and charge ring plate 59 is illustrated in FIG. 12. As shown therein, a pair of catchers 94 are mounted below charge ring plate 59 with a deflection ribbon 129 therebetween. Orifice plate 60 is soldered or otherwise bonded to an orifice plate holder 95, and orifice plate holder 95 is clamped against housing 61 by clamp members 97 and 98. A set of screws 99 (two of which are illustrated) maintain clamp members 97 and 98 in place. The screen 75 reduces ink turbulence, as above discussed, and an O ring 96 provides a seal between orifice plate holder 95 and housing 61.

Figure 5:
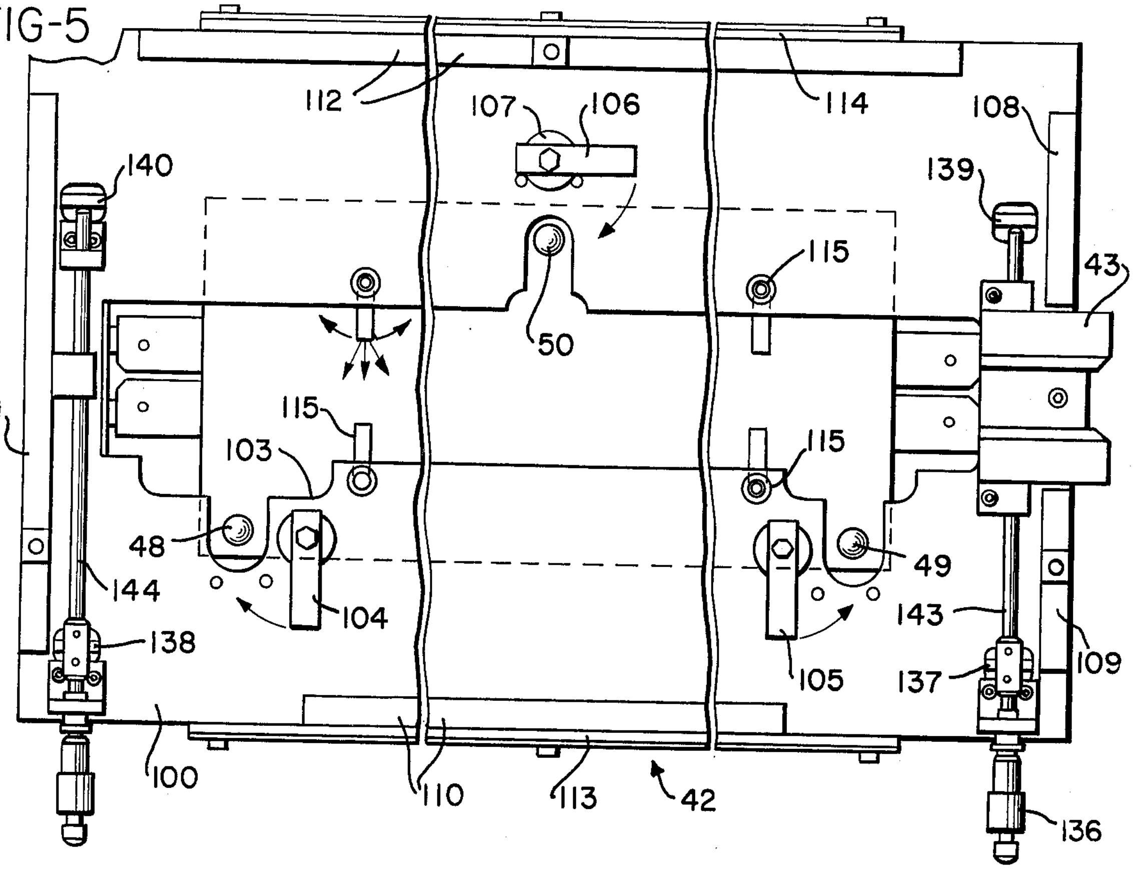
FIG. 5 is a top plan view of a lower assembly.

The principal structural member of lower assembly 42 is a support plate 100, which has an enlarged opening 103 as best seen in FIG. 5. Upper assembly 40 fits downwardly through opening 103 and is locked in place by three retainers 104 through 106. Retainers 104 through 106 are mounted on seats 107 for engaging the upper surfaces of rests 45 through 47.

For added structural support there are five stiffening members 108 through 112, which are attached to support plate 100. Also attached to support plate 100 are two clamping members 113 and 114, which clamp electrical cables 101 and 102, respectively. This prevents structural damage to charge ring plate 59.

A further feature of lower assembly 42 provides a flow of cleaning and jet stablilizing air between orifice plate 60 and charge plate 59. For this purpose the lower assembly has a series of air supply tubes such as tube 115 of FIG. 11. Clean air, which is supplied by these tubes, flows into the space between orifice plate 60 and charge plate 59, and thence out of the space by flowing downwardly through charge rings 77. The space between charge plate 59 and orifice plate 60 is enclosed by a set of air skirts such as skirt 116.

Figure 10:
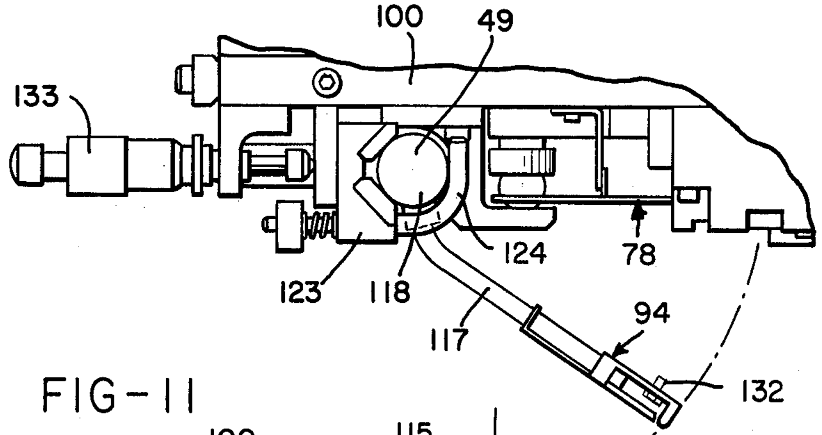
FIG. 10 is a fragmentary view illustrating downward swinging of a catcher.

Referring again to FIG. 12 it will be seen that catchers 94 are mounted in a position which obscures the lower surface of charge plate 59. During operation of the printer it sometimes becomes desirable to inspect the charge plate, and for this purpose catchers 94 can be swung downwardly as illustrated in FIG. 10. The mounting for the catchers enables such downward swinging while yet providing a capability for accurate adjustment of the operating positions of both catchers. The catcher assemblies, as illustrated in detail in FIGS. 33 through 37, each comprise a catcher 94 connected by four evacuation tubes 117 to a vacuum manifold 118. Vacuum manifold 118 is connected by two rotatable joints 120 to a pair of vacuum lines 119. Each joint 120 is sealed by seals 121, and in the operating position each vacuum line 119 communicates with its vacuum manifold 118 by an opening 122 in the wall of the manifold.

Figure 11:
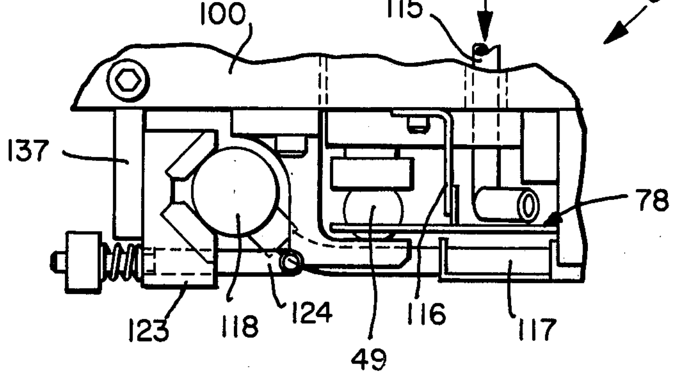
FIG. 11 is a fragmentary view illustrating means for providing air flow between an orifice plate and a charge plate.
Figure 17:
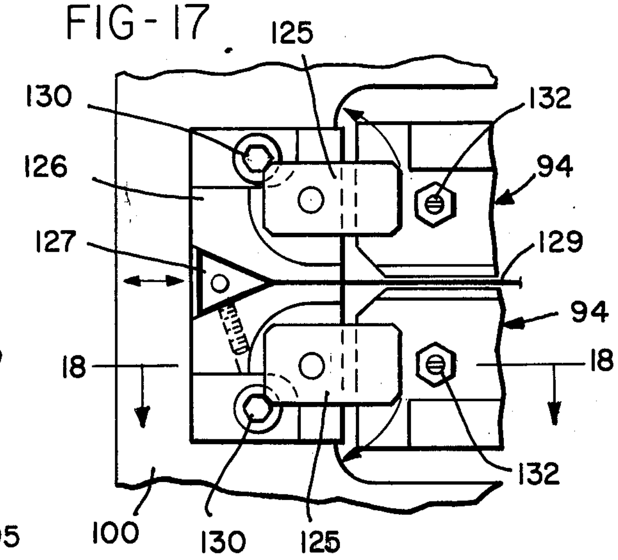
FIG. 17 is a bottom plan view showing support apparatus for a deflection ribbon.

The vacuum manifolds 118 are supported against vee blocks 123 by spring members 124, which may be rotated to the position shown in FIG. 11 to facilitate disassembly. When catchers 94 are in operating position they are supported at each end by a shoe 125 (see FIG. 17). Shoes 125 are mounted on end blocks 126 positioned at both ends of the catchers. Deflection ribbon 129 is stretched under tension between end blocks 126. For this purpose there are a pair of triangular tension blocks 127 about which deflection ribbon 129 is wrapped and which fit into notches in end blocks 126. The positions of end blocks 126 may be adjusted lengthwise of deflection ribbon 129 to control the tension thereon.

Figure 16:
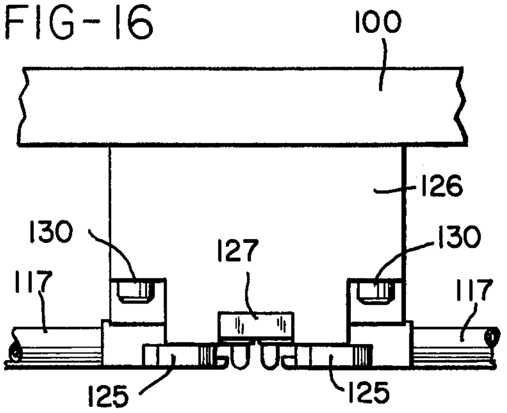
FIG. 16 is an end elevation view illustrating the positioning of a catcher support shoe.
Figure 18:
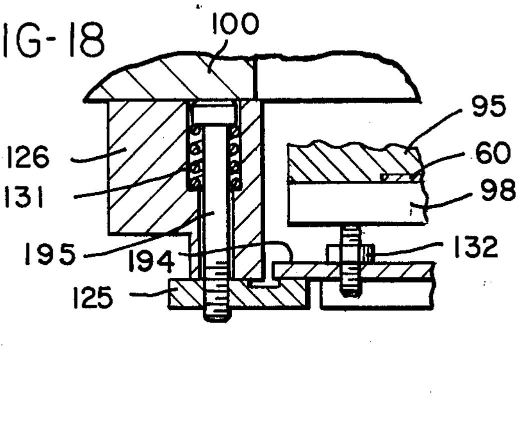
FIG. 18 is a view taken along lines 18—18 of FIG. 17.

The supporting relationship of shoes 125 to catchers 94 is shown in detail in FIG. 18. Shoes 125 are secured to end blocks 126 by bolts 195 and springs 131. Shoes 125 are therefore movably supported and reach outwardly to engage catchers 94 under overhanging ledges 194. The vertical spacing of catchers 94 relative to orifice plate 60 is adjusted by spacing devices 132 mounted on the upper surfaces of catchers 94. FIG. 16 illustrates the arrangement as viewed from the end of the printing head.

Horizontally inward and outward movement of catchers 94 relative to deflection ribbon 129 is controlled by micrometer-type adjustment knobs 133 through 136. Catchers 94 are mounted as above described against the blocks 123, and blocks 123 are supported by support brackets 137 through 140 as best illustrated in FIGS. 7 and 8. Support brackets 137 through 140 are pivotally mounted as at 141 and are urged against bias members 142 by shaft members positioned in response to manual adjustment of knobs 133 through 136.

Knob 136 controls the movement of a shaft 143, which reaches across the print head for positioning of bracket 139. Similarly, knob 135 positions a shaft 144 against bracket 140. Knobs 133 and 134 do not reach across the print head, but rather work directly against brackets 138 and 139 respectively. Thus, knobs 133 through 136 are all on the same side of the print head for convenient operator control.

Since knobs 133 through 136 are micometer-type devices, catchers 94 may be positioned along their entire length in precise relationship with deflection ribbon 129. This adjustment is easily accomplished with the print web transport mechanism retracted and replaced by a drip pan such as drip pan 145 of FIG. 29. Print head 40, which is mounted in a table top 147 of a table 146 is positioned over drip pan 145, and all jets are switched into the print mode (all drops in all jets being uncharged). This directs all jets into the drip pan. Both of catchers 94 are then advanced inwardly toward deflection ribbon 129 until the catching faces thereof just barely touch the jets of ink. Knobs 133 through 136 are thereafter adjusted to back the catchers away from this position by a predetermined distance. This should produce satisfactory catching, which can be checked by switching all jets into the catch mode. Table top 147 is connected to table 146 along a hinge line 148, so that print head 40 may be raised for servicing or inspection.

Startup and shutdown of the ink system is carried out generally in accordance with the teachings of Stoneburner U.S. Pat. No. 3,891,121. Accordingly, the ink supply cavity 149 of orifice plate holder 95 is maintained in a clean dry condition when the print head is not in use. Startup commences by pumping pressurized air into cavity 149, and following this with a purge fluid. After the purge fluid has formed free-standing, well stimulated jets, the flow of purge fluid is terminated, and ink is pumped into cavity 149. When printing is completed, fresh purge fluid is pumped into cavity 149 to replace the ink and clean out the system. After a short period of time the flow of purge fluid is terminated, and cavity 149 is dryed by application of a vacuum thereto.

Figure 30:
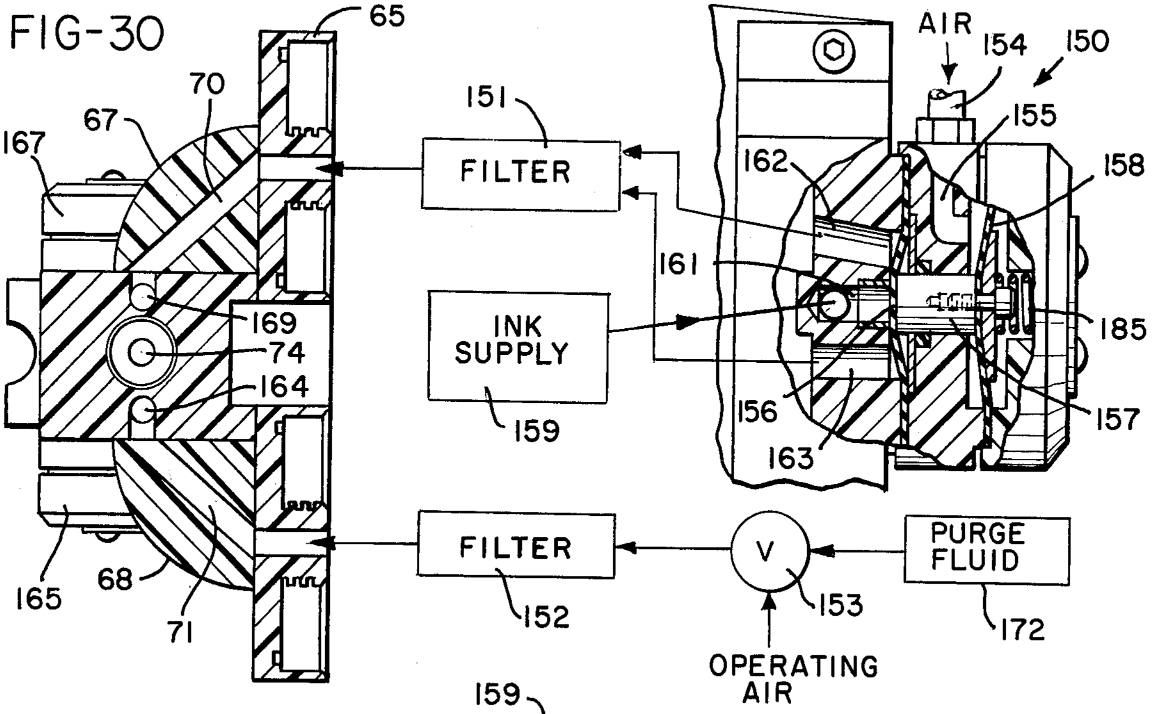
FIG. 30 is an illustration of a portion of an ink supply system for a jet drop printer.

In order to provide effective automatic control of the startup and shutdown sequences there has been provided a double diaphragm valve 150 as illustrated in FIG. 30. Valve 150 receives pressurized ink via conduit 161 from an ink supply 159 and operates under the control of pressurized air at inlet 154 to deliver the ink to conduits 162 and 163. Conduits 162 and 163 are connected to cannister type filter 151, which in turn provides filtered ink to passage 70 in rib member 67. A similar valve 153 supplies purge fluid from a pressurized supply tank 172 to passage 71 and rib member 68 via another cannister filter 152. Only valve 150 will be described in detail, it being understood that the description is applicable to valve 153.

Figure 39:
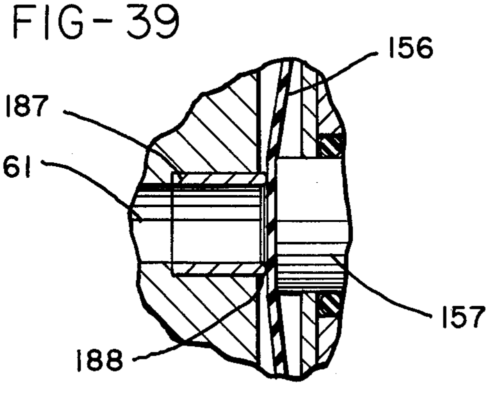
FIG. 39 is an enlarged view of a portion of FIG. 30 showing a valve seat.
Figure 37:
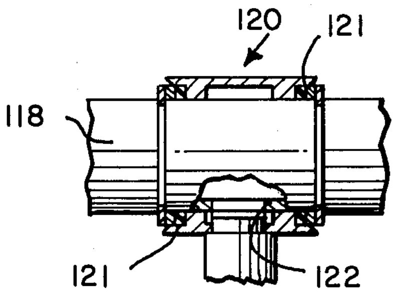
FIG. 37 is a view taken along lines 37—37 of FIG. 33.

Referring now to the enlarged view of FIG. 39 it will be seen that valve 150 has an insert 187 seated in conduit 161 with an upstanding lip 188. A first diaphragm 156 may be seated tightly against the lip 188 by a control rod 157, thereby shutting off the flow of ink through the valve. Insert 187 preferably is made of stainless steel and provides a tight line seal with only relatively modest force against control rod 157.

Control rod 157 is urged into the valve closing position of FIGS. 30 and 39 by a spring 185. Vavle 150 is therefore normally closed and is opened when the fluidics control system (not illustrated) delivers pressurized air to inlet 154. The air flows from inlet 154 through passage 155 to bear against a second diaphragm 158. Diaphragm 158 works against spring 185, so that when the pressurized air (typically at a pressure of about 3.5 Kg per sq. cm) bears against the diaphragm, spring 185 is compressed to withdraw rod 157 to a valve opening position.

As shown in FIG. 30 conduits 162 and 163 are connected to filter 151 near the center thereof, and are angled so as to cause an outwardly directed flow of the ink as it enters the filter. Thereafter the ink flows inwardly toward the axis of filter 151 for exit to passage 70.

Figure 38:
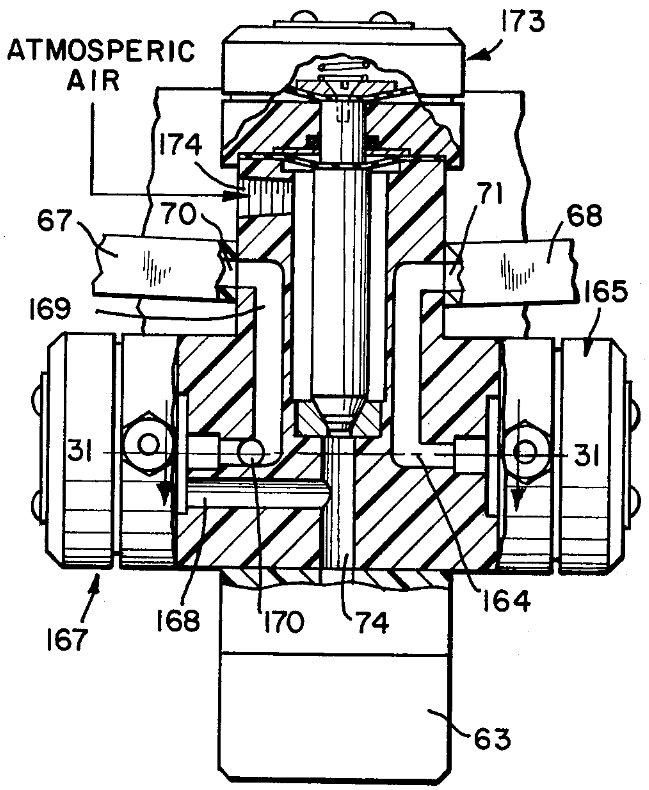
FIG. 38 is a partially cut away end view of an upper assembly for illustration of ink supply passages and purge liquid supply passages.
Figure 33:
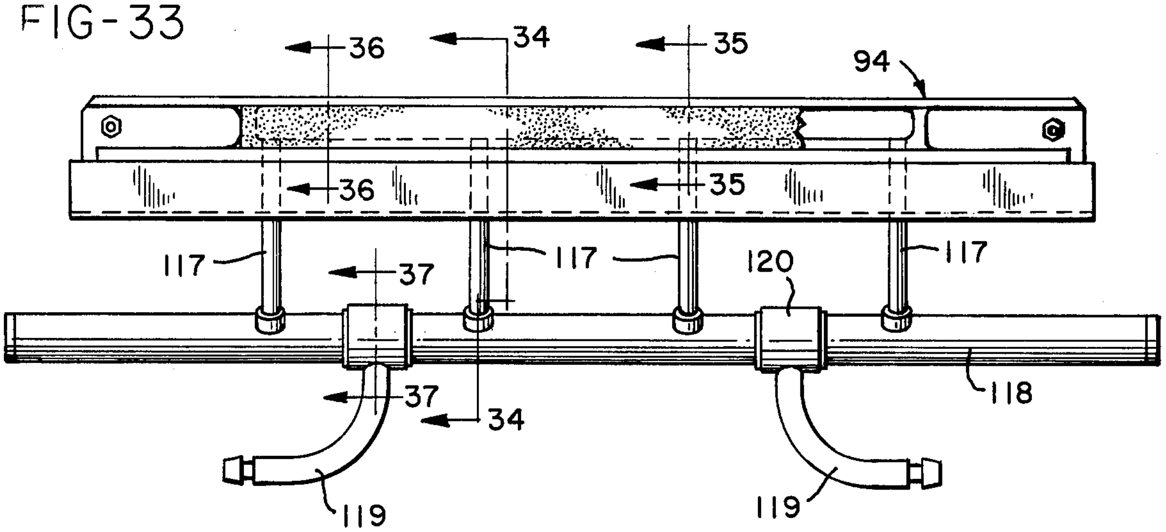
FIG. 33 is an illustration of a catcher assembly.
Figure 34:
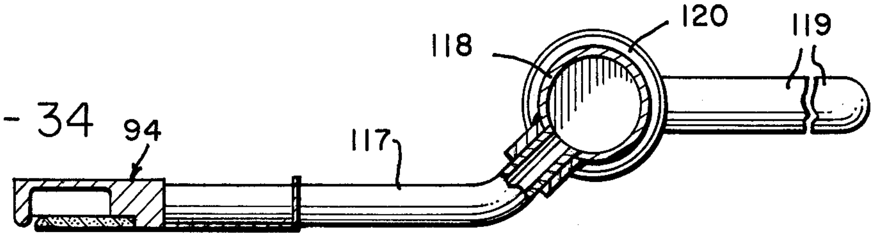
FIG. 34 is a view taken along lines 34—34 of FIG. 33.
Figure 35:
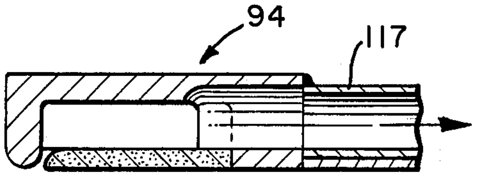
FIG. 35 is a view taken along lines 35—35 of FIG. 33.
Figure 36:
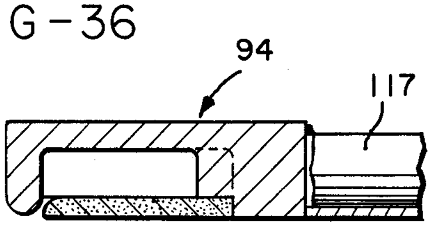
FIG. 36 is a view taken along lines 36—36 of FIG. 33.

Referring now to FIG. 38 it will be seen that filtered ink flows from passage 70 through another passage 169 to a valve 167. Valve 167 is similar in construction to valve 150 and is not illustrated in detail. An air supply, not illustrated, operates valve 167 to permit the flow of ink into passage 168, which is connected to passage 74 for supply to elongated cavity 181 of housing 61.

Figure 31:
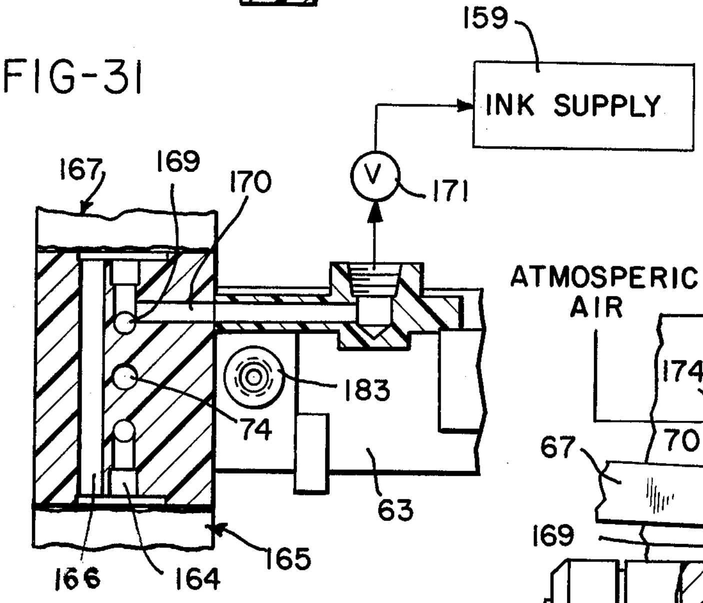
FIG. 31 illustrates a cross connection between a purge liquid supply valve and an ink supply valve.

Purge fluid flows from the purge fluid supply 172 through diaphragm valve 153 and cannister type filter 152 into passage 71 as previously discussed. The purge fluid then flows into a passage 164 which leads into diaphragm valve 165. Valve 165 is also of the same general construction as valve 150. Purge fluid does not flow directly from valve 165 into the supply passage 74 but is routed instead through the valve 167. A cross connection for this purpose is illustrated in FIG. 31. By this means it is possible to clean the liquid contacting portion of valve 167 with the purge fluid.

During the startup sequence when purge fluid must be supplied to the orifices 76, valve 150 is closed and valves 153, 165 and 167 are all opened to cause purge fluid to flow through valve 165, into the connecting passage 166, and through valve 167 into passage 168. Thus, valve 167 may be supplied with ink from passage 169 or with purge fluid from passage 166, but the outlet from valve 167 leads only to passage 168.

During shutdown periods with ink in the system and with valve 167 closed, ink is continually pumped through valve 150 and filter 151 into passage 169. From passage 169 the ink flows into a bypass passage 170 and out of the print head. Upon leaving the print head the ink flows through a valve 171, which is then opened, and back into the ink supply 159. Thus, there is provision to prevent collection of coagulated ink deposits by flushing valve 167 and maintaining a continuous flow of ink through other parts of the ink supply system.

As also illustrated in FIG. 38 there is a diaphragm valve 173 which may be opened to enable entry of atmospheric air (or filtered air at atmospheric pressure) into passage 174. The atmospheric air enters the print head at opening 174 which is connected by valve 173 with passage 174.

Figure 9:
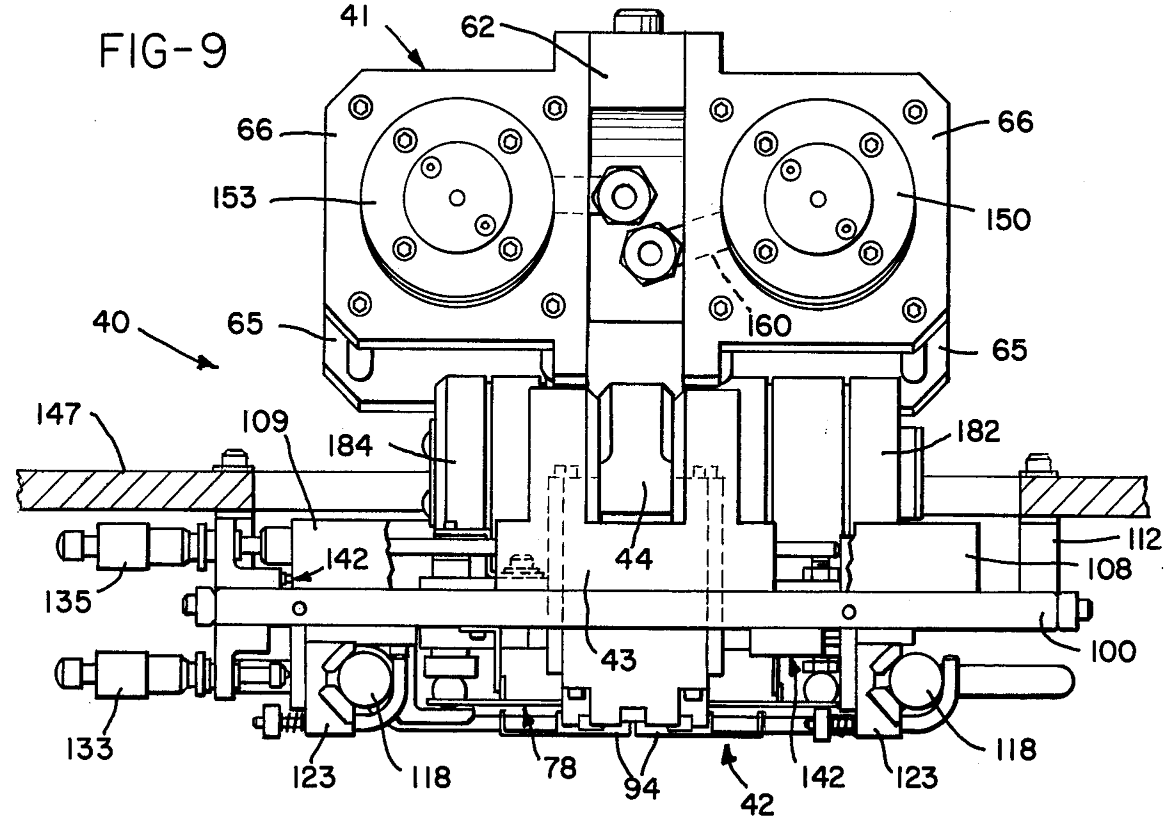
FIG. 9 is an end elevational view of a jet drop print head.
Figure 32:
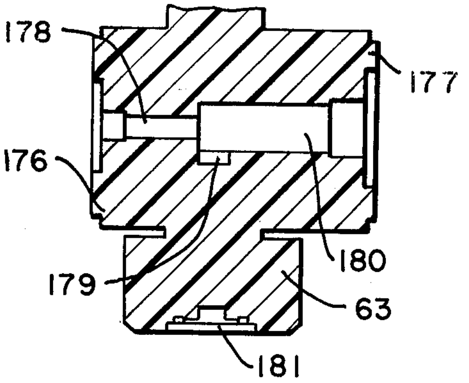
FIG. 32 is a view taken along lines 32—32 of FIG. 2.

Another pair of valves 184 and 182 are connected respectively to pressurized air and vacuum sources. These valves, which are illustrated in FIG. 9, are also air operated diaphragm valves, and they are connected to passage 179 (FIG. 2), which opens into the orifice plate supply cavity 181. Valve 184 is mounted on a seat 176 (FIG. 32), and valve 182 is mounted on a seat 177. When valve 184 is open, pressurized air flows into a passage 178 and thence through passage 179 and cavities 181 and 149 to orifice plate 60. This is the operating condition of the system during startup and prior to admission of purge fluid into cavity 149. Passage 180 of FIG. 32 enables application of a vacuum to cavity 149. This vacuum application is made for a short period of time after shutdown as above described.

While the method herein described, and the form of apparatus for carrying this method into effect constitute a preferred embodiment of the invention, it is to be understood that the invention is not limited to this precise method and form of apparatus and that changes may be made in either without departing from the scope of the invention.

What is claimed is:

1. In a jet drop printing head comprising an upper assembly including an orifice plate and a lower assembly including a charge plate, apparatus for producing relative alignment between said orifice plate and said charge plate comprising:

a. a set of positioning elements mounted at predetermined positions on one of said plates, b. a set of reference elements mounted on the assembly including the other one of said plates;

said reference elements being located for mating engagement with said positioning elements and adjustable for causing said relative alignment.

2. Apparatus according to claim 1 wherein said positioning elements are three hard-surfaced balls mounted at triangularly spaced positions on their associated plate.

3. Apparatus according to claim 2 wherein said balls are mounted on said charge plate and said reference elements are three rests having ball engaging feet and being mounted on said upper assembly in positions for mating with and resting upon said balls.

4. Apparatus according to claim 3 wherein one of said feet has a conical recess for engaging its associated ball in a relationship prohibiting relative horizontal movement, a second of said feet has a vee-shaped recess for engaging its associated ball in a relationship restricting relative horizontal movement to movement along a single line, and the last of said feet has a flat lower surface for resting on its associated ball without horizontal constraint.

5. Apparatus according to claim 4 wherein said lower assembly includes three brackets for receiving said balls, the receiving surfaces of said brackets being configured in like manner as the surfaces of said feet which respectively rest on said balls above said brackets.

6. Apparatus according to claim 4 wherein the rest having the foot with the conical recess and the rest having the foot with the vee-shaped recess are supported rotatably about vertical axes, said feet being offset from their respective axes for producing horizontal movement of their recesses by rotation of said rests.

7. Apparatus according to claim 6 wherein one of said rests is mounted for relatively large horizontal positionally adjusting movement.

8. Apparatus according to claim 4 further comprising means for vertically pivoting connection between said upper assembly and said lower assembly to facilitate lowering of said rests onto said balls during the joining of said upper and lower assemblies.

9. Apparatus according to claim 8 further comprising import absorbing means to cushion the shock of said joining.

10. Apparatus according to claim 1 wherein said reference elements are vertically adjustable for adjusting the separation distance between said orifice plate and said charge plate.

11. Apparatus according to claim 10 wherein said set of positioning elements are three spherical positioning elements mounted at triangularly spaced positions on said charge plate and said reference elements are three rests mounted within threaded inserts on said upper assembly.

12. Apparatus according to claim 11 wherein said rests are provided with feet for engaging said spherical positioning elements, one such foot being provided with a spherical recess in its lower surface, one foot being provided with a vee-shaped recess in its lower surface, and the third foot having no recess in its lower surface.

13. Apparatus according to claim 12 wherein those of said feet having recesses in their lower surfaces are mounted offset from the vertical axes of their respective rests, and wherein said rests are rotatable about said axes to produce horizontal movement of said feet.

14. Apparatus according to claim 13 wherein said upper assembly comprises means for rough horizontal positioning adjustment of one of said rests.

15. Apparatus according to claim 14 wherein said spherical elements are mounted in seating apertures in said charge plate and protrude therethrough.

16. Apparatus according to claim 15 wherein said lower assembly comprises three brackets for supporting said spherical positioning elements, said brackets having upper surface configurations corresponding to the surface configurations of the lower surfaces of those of said feet which are respectively associated therewith.

17. Apparatus according to claim 16 wherein said spherical elements have surface grooves for seating in said seating apertures.

18. Apparatus according to claim 17 wherein said spherical elements all have the same diameter.

19. Apparatus according to claim 1 wherein said positioning elements are mounted on said charge plate.

20. A jet drop print head comprising:

a. an upper assembly including a manifold provided with means for generating a row of printing jets and three vertically adjustable locating feet, at least two of which feet are also horizontally adjustable, and b. a lower assembly including a charge plate and an elongated catcher positioned in drop catching relationship with said jets;

said charge plate being provided with a row of charge ring defining apertures and three spherical positioning elements for engaging said locating feet and bringing said apertures into registration with jets.

21. For a jet drop print head the subcombination comprising:

a. a charge plate provided with at least one row of charge ring apertures, conductive charge-electrode-defining material lining said apertures, a series of electrical leads connected to said charge electrodes, and three triangularly spaced ball seat apertures, and b. three hard metal precision manufactured balls seated in said ball seat apertures and bonded in place.

22. The subcombination of claim 20 wherein said balls all have the same diameter.

23. The subcombination of claim 22 wherein said balls have surface grooves for seating in said ball seat apertures.

24. A method of assembling a jet print head upper assembly including an orifice plate with a jet print head lower assembly including a charge plate comprising the steps of 1. mounting a set of three adjustable reference elements on said upper assembly,
2. positioning said reference elements at predetermined locations relative to said orifice plate,
3. positioning a set of three positioning elements on said charge plate in locations corresponding to the locations of said reference elements relative to said orifice plate, and
4. mating said upper assembly to said lower assembly with said set of reference elements engaging said set of positioning elements.

* * * * *